United States Patent [19]

Uno

[11] Patent Number: 5,128,812
[45] Date of Patent: Jul. 7, 1992

[54] DATA TRANSDUCER POSITIONING SYSTEM FOR ROTATING DISK DATA STORAGE APPARATUS

[75] Inventor: Hisatoshi Uno, Tokyo, Japan
[73] Assignee: TEAC Corporation, Tokyo, Japan
[21] Appl. No.: 549,766
[22] Filed: Jul. 9, 1990

[30] Foreign Application Priority Data

Jul. 14, 1989 [JP] Japan .................... 1-182302

[51] Int. Cl.$^5$ .................................. G11B 5/55
[52] U.S. Cl. ..................... 360/78.06; 360/78.04; 318/561
[58] Field of Search ............ 360/78.04, 78.06, 78.07, 360/78.08, 78.12; 318/561

[56] References Cited

U.S. PATENT DOCUMENTS 5,010,425 4/1991 Asai .................... 360/78.04

FOREIGN PATENT DOCUMENTS 52-77710 6/1977 Japan .................... 360/78.06

OTHER PUBLICATIONS

Thater, George J., *Automatic Control Systems*, West Publishing Co., 1989, Sec. 11.7.

*Primary Examiner*—Andrew L. Sniezek
*Assistant Examiner*—David L. Robertson
*Attorney, Agent, or Firm*—Woodcock Washburn Kurtz Mackiewicz & Norris

[57] ABSTRACT

A system for positioning a transducer with respect to a multiplicity of concentric annular data tracks on a rotating hard magnetic disk. Included is a differential amplifier for providing an output proportional to the difference between a transducer speed signal representative of the actual traveling speed of the transducer and a seek speed signal representative of desired variable speed at which the transducer is to be moved to any desired destination track. A low pass filter is provided for eliminating an undesirable higher frequency component from the output from the differential amplifier, before this output is sent to a driver circuit for a transducer positioning motor such as a voice coil motor. In order to minimize the adverse effects arising from the phase lag introduced by the low pass filter, this filter is made switchable between two different cutoff frequencies. Each track seeking operation starts with the low pass filter held at the lower cutoff frequency. The filter is switched to the higher cutoff frequency when the distance between the instantaneous current position of the transducer and the destination track decreases to a predetermined value.

6 Claims, 6 Drawing Sheets

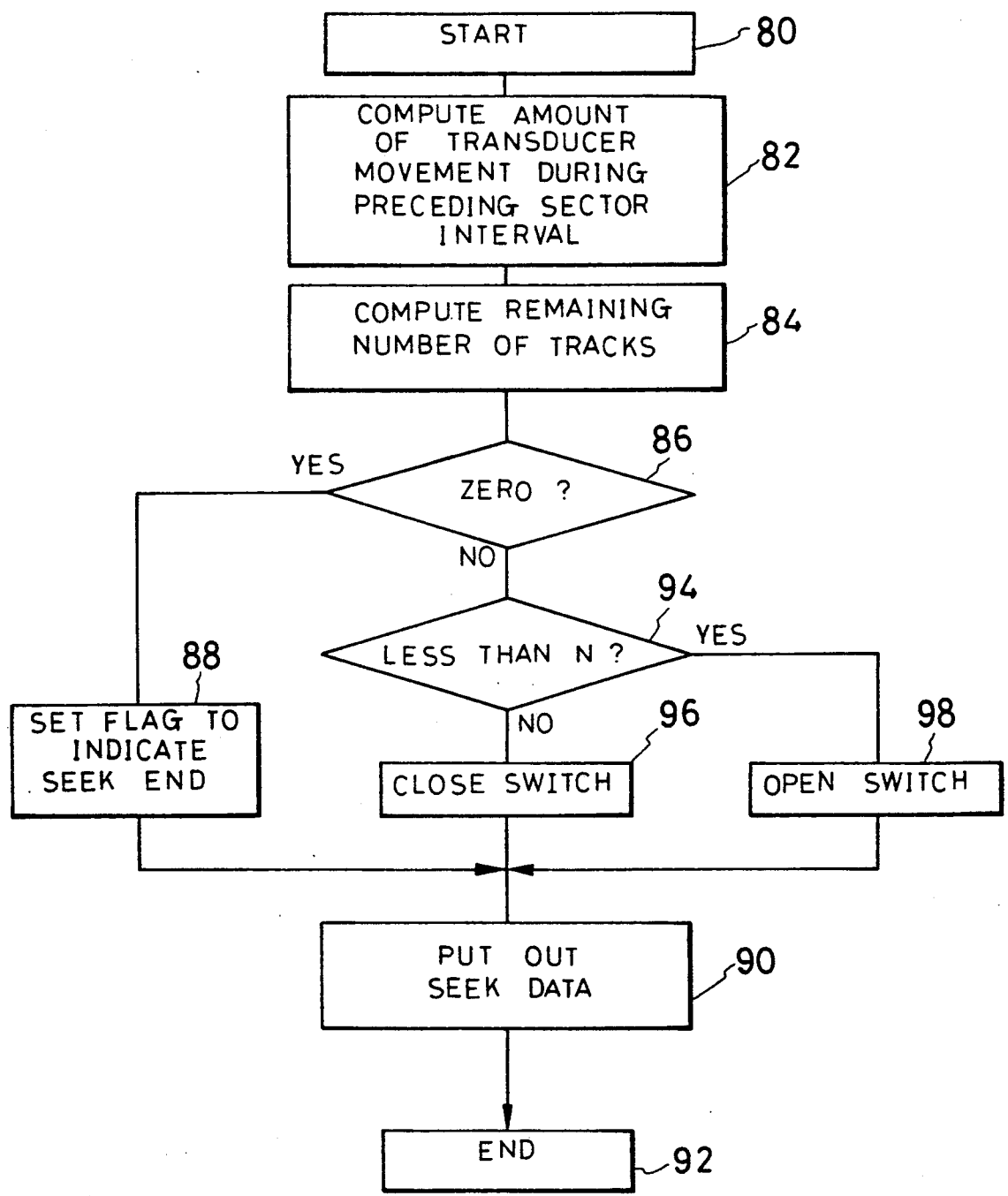

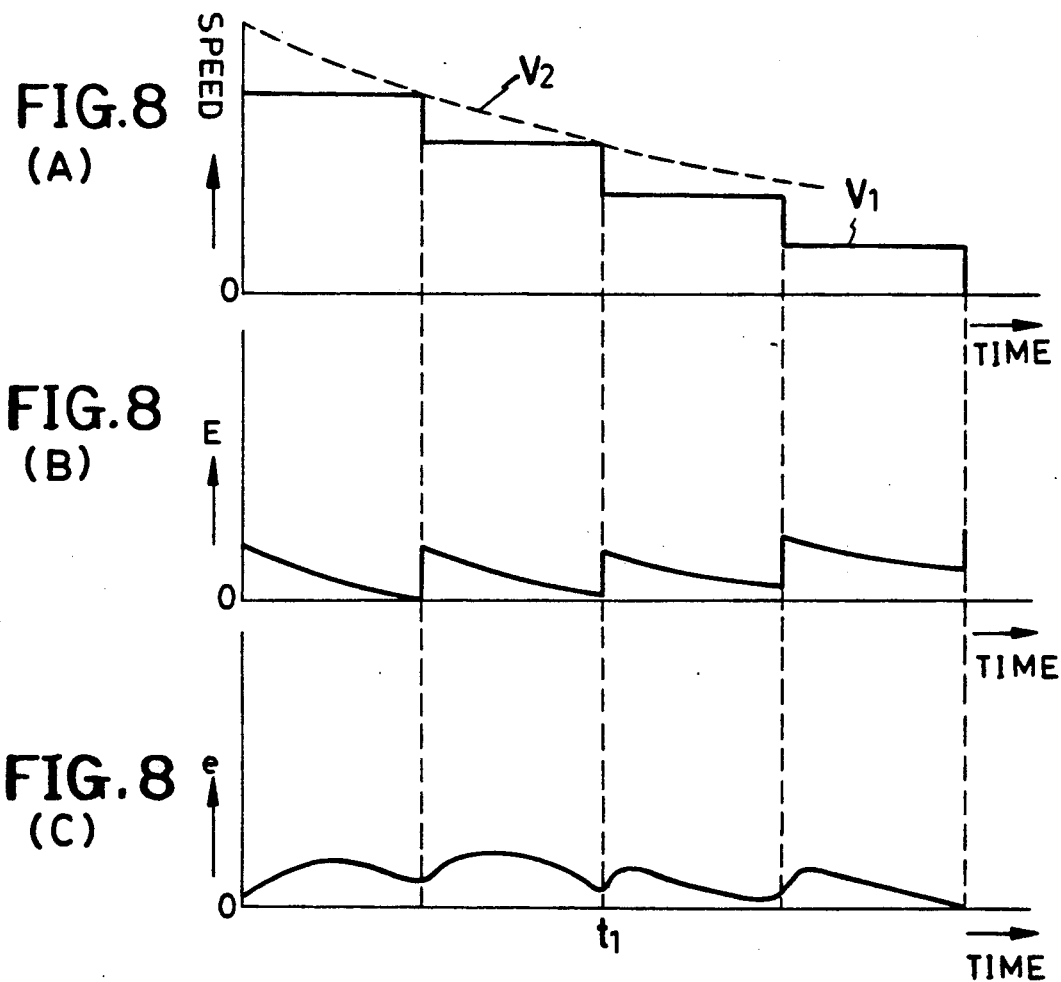
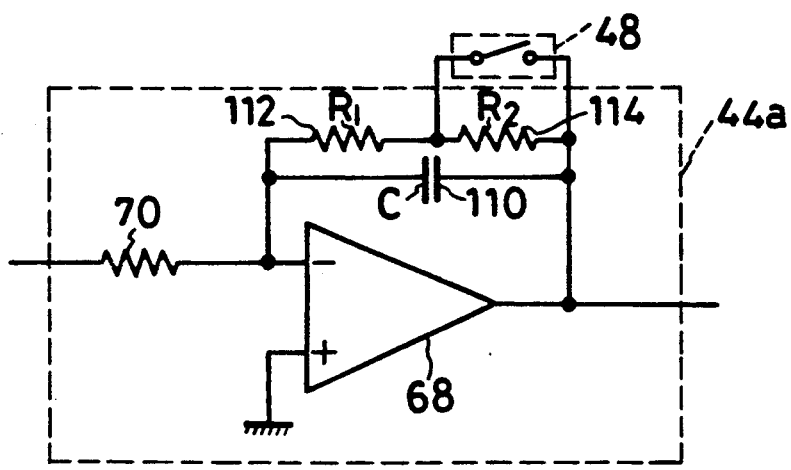

DATA TRANSDUCER POSITIONING SYSTEM FOR ROTATING DISK DATA STORAGE APPARATUS

BACKGROUND OF THE INVENTION

My invention relates generally to an apparatus for the transfer (reading and/or writing) of data with disklike record media such as magnetic disks notably including those of the "fixed" or hard disk variety. More particularly, my invention pertains to a positional control system for a data transducer or head in such an apparatus in accessing the transducer to any of a multiplicity of concentric data tracks, or to any radial position on a single multiturn spiral track, on the rotation disk.

The majority of hard disk drives commercially available today employ some form of rotary or linear actuator such as a voice coil motor under closed loop electronic servo control for positioning the transducer in centerline alignment with any of the data tracks on the disk. For each such track seeking operation the transducer positioning system generates a seek speed signal for causing transducer movement at an optimum speed depending upon the distance from the current transducer position to the destination track. Also, during the track seeking operation, a signal is generated which represents the actual traveling speed of the transducer. Both the seek speed signal and the actual transducer speed signal are directed into a differential amplifier. The resulting signal representative of the difference between the desired and actual transducer speeds is then applied to a motor drive amplifier via a low pass filter (LPF).

The LFP serves to make transducer movement smoother by removing unnecessary higher frequency components from the difference signal. This advantage has so far been nearly offset, however, by the phase lag introduced by the LPF into the closed loop servo control system. The phase lag has resulted in the tendency of the transducer to travel back and forth past the destination track.

It might be contemplated to alleviate this inconvenience by making the cutoff frequency of the LPF higher. This solution is unsatisfactory for two primary reasons. One is that the transducer would be subjected to greater variations in speed while traveling at high speed, resulting in the production of greater audible noise than heretofore. The other is that the feedback control system would become unstable in operation.

SUMMARY OF THE INVENTION

I have hereby invented how to overcome the above discussed difficulties heretofore experienced in connection with the LPF.

Briefly, my invention may be summarized as a transducer position control system in a data storage apparatus of the type having a transducer for data transfer with a rotating data storage disk. The transducer position control system comprises positioning means connected to the transducer for moving the same substantially radially of the data storage disk and for positioning the transducer over a selected position in the radial direction of the disk, control circuit means for providing a seek speed signal representative of variable desired speed at which the transducer is to be moved by the positioning means with respect to the data storage disk, and a speed sensor coupled to the positioning means for generating a transducer speed signal representative of the actual traveling speed of the transducer.

Connected to both the control circuit means and the speed sensor is a difference signal generator circuit, such as a differential amplifier, which puts out a difference signal representative of the difference between the seek speed signal and the transducer speed signal. The difference signal generator circuit is connected via a low pass filter to a driver circuit which in turn is connected to the positioning means for causing the same to move the transducer at a variable speed determined by the output from the low pass filter.

One of the most pronounced features of my invention is the fact that the low pass filter is constructed to provide two different cutoff frequencies. A frequency select switch is provided for a change from one cutoff frequency to the other. Each track seeking operation starts with the low pass filter held at the lower cutoff frequency. The filter is switched to the higher cutoff frequency when the distance between the instantaneous current position of the transducer and the destination track decreases to a predetermined value.

Thus the transducer can be moved smoothly during the greater part of each track seeking operation when the low pass filter is held at the lower cutoff frequency. Then, as the filter is switched to the higher cutoff frequency toward the end of the seek operation, the positioning motor more faithfully responds to the difference signal for accurately positioning the transducer on the destination track.

The above and other features of my invention and the manner of realizing them will become more apparent, and the invention itself will best be understood, from a study of the following description and appended claims, with reference had to the attached drawings showing some preferred embodiments of my invention.

BRIEF DESCRIPTION OF THE DRAWINGS

FIG. 5 is a flowchart of the seek routine of the tranducer positioning system;

FIG. 8, consisting of (A)–(C), is a graphic representation of various signals useful in explaining the operation of the transducer positioning system of FIG. 1; and FIG. 9 is a schematic electrical diagram showing an alternative to the low pass filter of FIG. 3.

DESCRIPTION OF THE PREFERRED EMBODIMENTS

Figure 1:
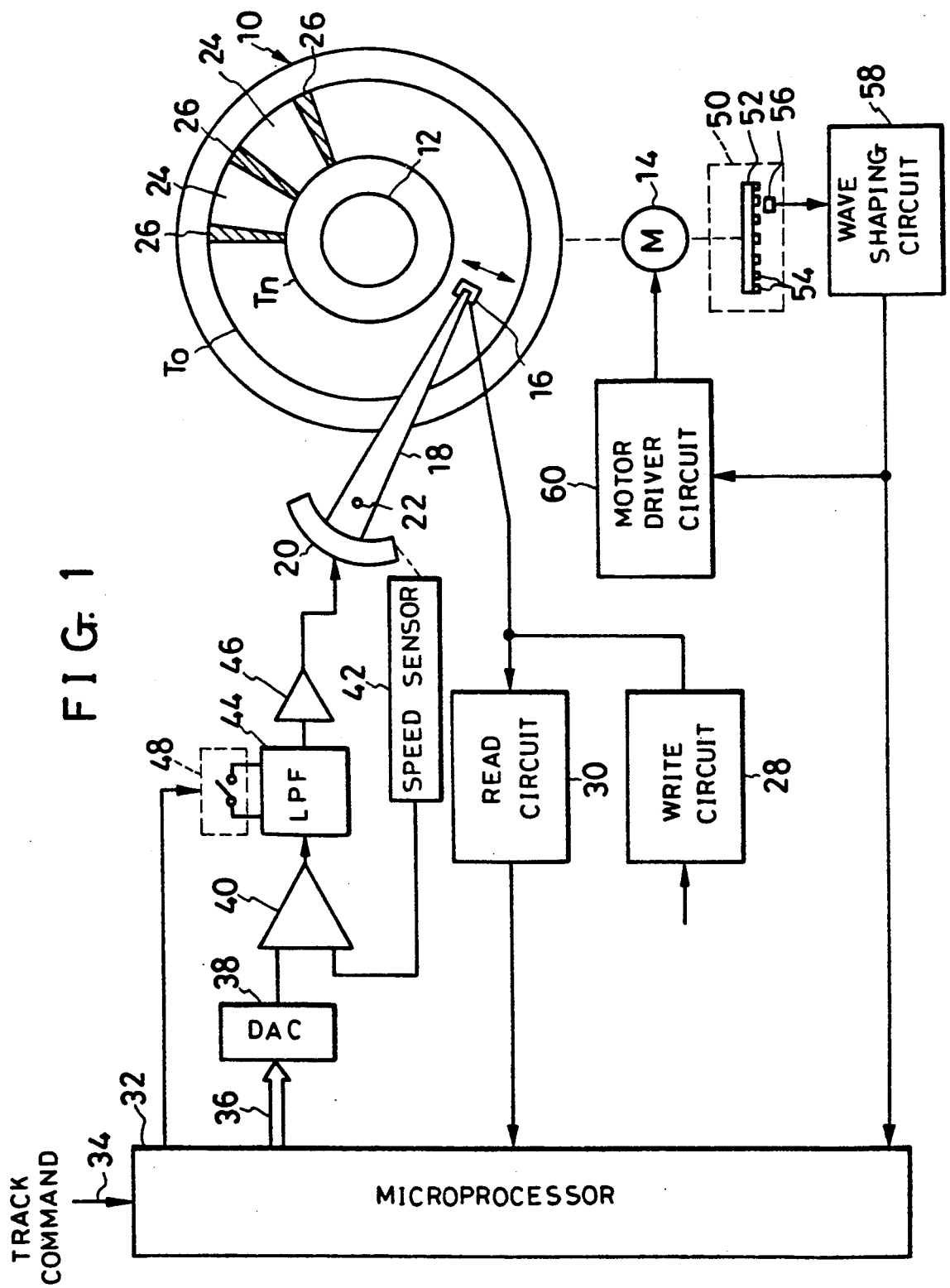
FIG. 1 is a block diagram of the transducer positioning system embodying the principles of my invention, the positioning system being shown adapted for use in a hard magnetic disk data storage apparatus.

I will now describe our invention as embodied in a hard disk drive forming part of a data processing system shown diagrammatically in FIG. 1. The representative system is shown highly simplified, having but one magnetic disk 10. In practice, however, a stack of two or more such disks may be employed. It is allso assumed for the simplicity of disclosure that the illustrated disk 10 is single-sided, with a multiplicity of annular data tracks formed concentrically on one side only. I have shown only the radially outmost track $T_o$ and radially inmost track $T_n$ for illustrative convenience. The disk 10 is mounted fast on a drive spindle 12 which is coupled, either directly or indirectly, to a disk drive motor 14.

Disposed opposite the data storage surface of the disk 10 is a transducer or magnetic read/write head 16 which is gimbaled on the distal end of a carrier beam 18. The transducer carrier beam 18 is coupled to a positioning actuator herein shown as a voice coil motor 20 of conventional make. Driven by this motor, the transducer carrier beam 18 is to swing about a pivot 22 in a plane parallel to the plane of the disk 10. Thus the transducer 16 is to travel across the data tracks on the disk 10 and to be positioned on any selected one of these tracks.

As is conventional in the disk drive art, the transducer 16 is in contact with a predefined landing zone on the disk surface when the disk is out of rotation. The landing zone may be either radially inside or outside the data tracks. The transducer 16 slides over the landing zone when the disk is set into rotation. Then, as the disk picks up speed, the transducer rides upon an air cushion created by disk rotation and aerodynamically starts flying over the disk surface for reading or writing data thereon.

As is also well known in the art, the disk 10 has a plurality (e.g. sixteen) of data sectors 24 interleaved with as many servo sectors 26. I have, however, indicated only three neighboring servo sectors by hatching for illustrative convenience.

I understand that each data sector conventionally contains data fields and identification fields with intervening gaps. The data fields are for the storage of user data. The identification fields have prerecorded thereon the data representative of the identification number preassigned to that sector. Each servo sector is also understood to have conventionally prerecorded thereon track numbers and additional data for synchronization and tracking control purpose.

Both write circuit 28 and read circuit 30 are electrically connected to the transducer 16. The write circuit 28 supplies to the transducer 16 a write current that has been modified to represent the desired data to be written in the frequency modulation or modified frequency modulation format. The read circuit 30 conventionally comprises an amplifier, a differentiator, and a wave shaping circuit for processing the transducer output signal into discrete pulses representative of the information read from both data sectors and servo sectors of the disk 10. The read circuit 30 sends the read data pulses to a disk drive controller microprocessor 32 which, as is well known, controls the disk drive under the direction of a host computer, not shown.

Conventionally comprising a central processor unit, a random access memory, a read only memory, etc., the disk drive controller microprocessor 32 produces digital seek data indicative of the desired speed at which the transducer 16 may be moved to the destination track requested by the track command sent from the unshown host computer over a line 34. The speed data is sent over a bus 36 to a digital to analog converter (DAC) 38. The microprocessor 32 also produces a seek direction signal representative of the direction (i.e. radially inward or outward of the disk 10) in which the transducer 16 may be driven. I have, however, not shown the seek direction control circuit means as such means are conventional and fall outside the scope of my invention.

The DAC 38 is connected to a differential amplifier 40, to which is also connected a transducer speed sensor 42. The transducer speed sensor 42 can be of the known construction comprising a coil coupled to the transducer carrier beam 18 for movement therewith across a given magnetic field. Thus, the transducer speed sensor 42 generates and puts out a voltage signal representative of the actual speed, as well as direction, of movement of the transducer 16 across the data tracks on the magnetic disk 10. It will therefore be understood that the differential amplifier 40 puts out a signal representative of the variable difference between the desired and actual speeds of transducer travel from any departure track to any destination track on the disk surface.

The differential amplifier 40 has its output connected to the voice coil motor 20 via an LPF 44 and a motor driver amplifier 46. The LPF 44, which forms the gist of my invention, has two different cutoff frequencies. A change between the two cutoff frequencies is made by a frequency select switch 48 which is conneced to, and controlled by, the microprocessor 32. The frequency select switch 48 is to be opened or closed depending upon the remaining number of tracks to be traversed by the transducer 16 during each track seek operation, as will be discussed in further detail subsequently.

Seen at 50 is a disk speed sensor coupled to the disk drive motor 14 for generating a series of pulses representative of both the speed of rotation of the magnetic disk 10 and the positions of the disk sectors with respect to the transducer 16. I have shown the disk speed sensor 50 as comprising a rotary disk 52 which is rotatable with the disk drive motor 14 and which has arranged thereon an annular series of as many magnetic elements 54 as there are servo (or data) sectors on the disk 10, and a magnetic pickup 56 disposed opposite the rotary disk 52. Thus, with each revolution of the disk 10, the disk speed sensor 50 generates and puts out sixteen pulses.

The disk speed sensor 50 has its output connected to a wave shaping circuit 58, which in turn is connected to both the microprocessor 32 and a motor driver circuit 60. The motor driver circuit 60 is connected to the disk drive motor 14.

Having a recurrence rate proportional to the speed of rotation of the disk 10, the output pulses of the disk speed sensor 50 can be utiilized by the motor driver circuit 60 driving the disk drive motor 14 at a prescribed constant speed. The disk speed sensor output pulses also present the positions of the servo sectors on the disk surface. Accordingly, the microprocessor 32 utilizes the disk speed sensor output pulses as a timing signal for sampling the track numbers being read by the transducer 16 during track seeking.

Figure 2:
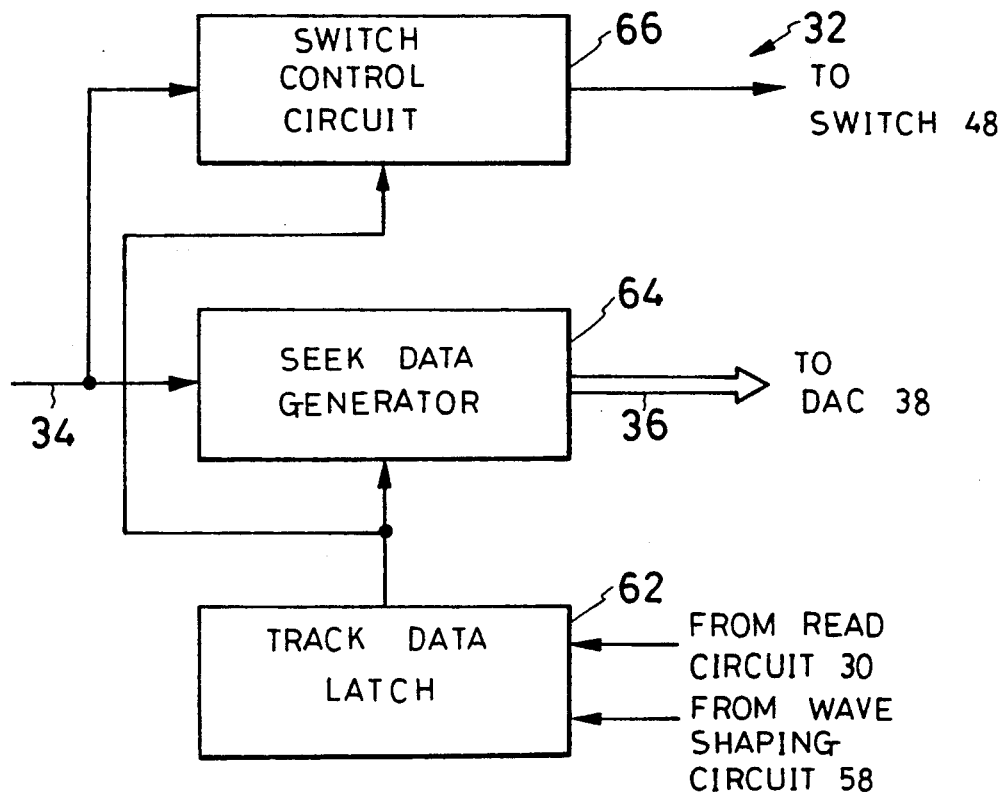
FIG. 2 is a blocck diagram showing a functional equivalent of the digital disk drive controller microprocessor in the data storage apparatus of FIG. 1.

I have block digrammatically illustrated in FIG. 2 the functions of the microprocessor 32 insofar as is concerned with my invention. A track data latch 62 has inputs connected to the read circuit 30 and the wave shaping circuit 58 both shown in FIG. 1. The track data, or the actual instantaneous position of the transducer 16 with respect to the data tracks on the disk 10, is clocked into the track data latch 62 under the control of the sector pulses from the wave shaping circuit 58.

Inputting the track data from the track data latch 62, a seek data generator circuit 64 generates the noted seek data for making zero the difference between the current position of the transducer, as represented by the track data, and the destination track indicated by the track command supplied from the unshown host computer over the line 34. The seek data is sent as aforesaid over the bus 36 to the DAC 38 of FIG. 1. The seek data includes that which represents the optimum speed at which the transducer may be moved to zero the difference between the current track and the destination track as quickly as possible. The seek data is updated each time the track data is renewed by the actual instantaneous position of the transducer 16 traveling toward the destination track.

The track data latch 62 is additionally connected to a switch control circuit 66 for the on off control of the cutoff frequency select switch 48, FIG. 1, of the LPF 44. The track command line 34 is also connected to the switch control circuit 66. The switch control circuit 66 determines the decreasing difference between the destination track and the current track over which the transducer is positioned. When this difference decreases to a predetermined value, the switch control circuit 66 actuates the LPF switch 48 for changing the cutoff frequency of the LPF 44 from the lower to the higher value.

Figure 3:
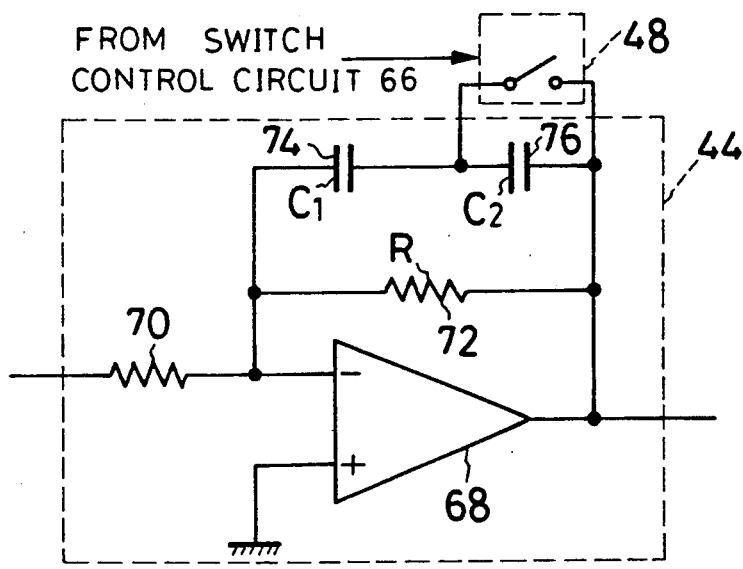
FIG. 3 is a schematic electrical diagram showing the low pass filter of FIG. 1 in more detail.

FIG. 3 is a detailed illustration of the LPF 44, shown together with the cutoff frequency select switch 48. The LPF 44 is an active filter, comprising an operational amplifier 68 having one input connected via an input resistor 70 to the differential amplifier 40, FIG. 1, and another input grounded. A feedback resistor 72 and a serial circuit of two capacitors 74 and 76 are connected between said one input and the output of the operational amplifier 68. The cutoff frequency select switch 48 is connected in parallel with the capacitor 76.

In the LPF 44 of the foregoing construction, let $C_1$ and $C_2$ be the capacitances of the capacitors 74 and 76, and R be the resistance of the resistor 72. Then the cutoff frequency $f_1$ in hertz of the LPF 44 when the switch 48 is closed can be defined as:

$$f_1 = \frac{1}{2\pi C_1 R}.$$

The cutoff frequency $f_2$ of the LPF 44 when the switch 48 is open, on the other hand, can be expressed as:

$$f_2 = \frac{1}{2\pi \left(\frac{C_1 C_2}{C_1 + C_2}\right) R}.$$

It is thus seen that the cutoff frequency $f_1$ of the LPF 44 when the switch 48 is closed is lower than that, $f_2$, when the switch is open. The cutoff frequency of the LPF 44 is therefore variable between two preselected values by the on off control of the switch 48.

Figure 4A:
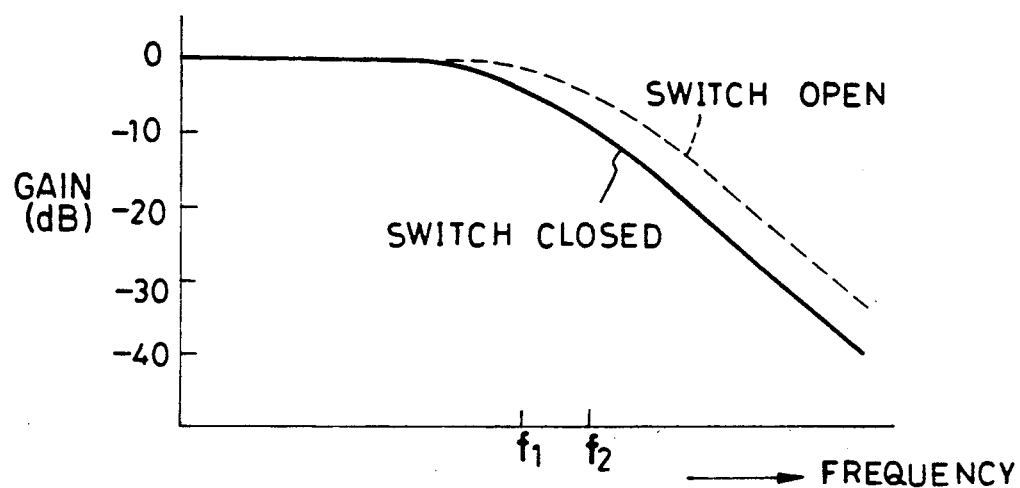
FIG. 4A is a graphic representation of the frequency-gain characteristic of the closed loop transducer positioning system of FIG. 1.
Figure 4B:
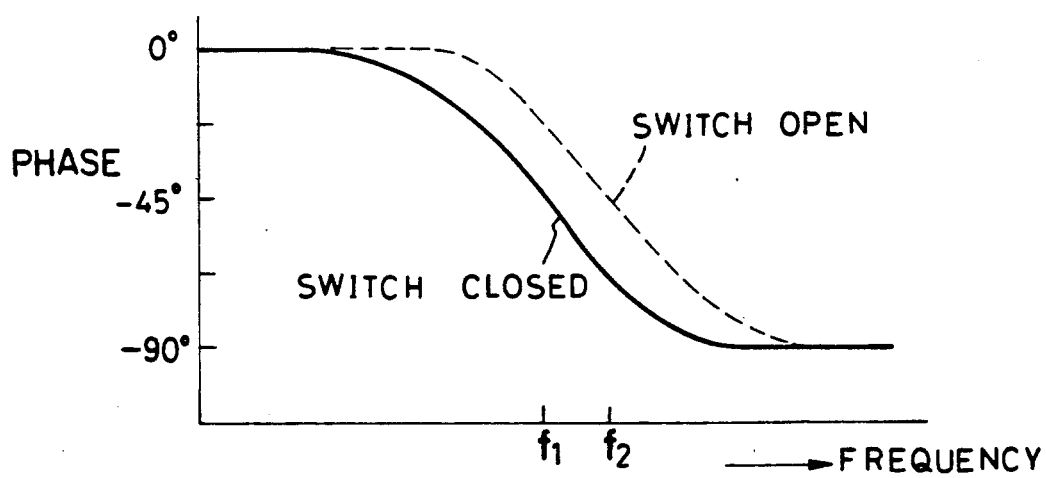
FIG. 4B is a graphic representation of the frequency-phase characteristic of the transducer positioning system.

FIGS. 4A and 4B are graphic representations of the frequency-gain characteristics and frequency-phase characteristics, respectively, of the feedback control loop, including the LPF 44, when the cutoff frequency select switch 48 is closed (solid line curves) and open (dashed curves). It will be noted that the higher cutoff frequency $f_2$ when the switch 48 is open is effective to reduce the phase delay.

OPERATION

For the most efficient, speedy accomplishment of seek operation in accordance with the principles of any invention, I suggest that the ROM, not shown, of the microprocessor 32 be preprogrammed as in the flowchart of FIG. 5. The seek routine starts at 80 in response to the track command from the host computer. At a block 82 the microprocessor 32 computes the amount of transducer movement during the preceding one sector interval for the determination of the optimum desired traveling speed of the transducer during the following sector interval. One sector interval is the time required for disk rotation through one sector angle.

The next block 84 involves the computation of the remaining number of tracks to be traversed by the transducer until it arrives at the requested destination track. Then, at a logical node 86, it is determined if the remaining number of tracks is zero. If the answer is yes, a flag is set at a block 88 to indicate the end of track seeking. The seek speed signal representative of zero is subsequently generated at a block 90, and the seek routine ends at a block 92.

If the answer to the node 86 is no, on the other hand, then it is determined at the next node 94 whether the remaining number of tracks is less than a predetermined value N or not. The predetermined value N can be relatively small. If the answer is no, the cuttoff frequency select switch 48 is closed at a block 96, and the seek speed signal representative of the optimum speed at which the remaining tracks are to be traversed is generated at the next block 90. The seek routine during one sector interval comes to an end at the block 92. Thereafter, as the wave shaping circuit 58 sends the next sector pulse, the microprocessor 32 restarts the seek routine at the block 80.

If the answer to the node 94 is yes, on the other hand, then the cutoff frequency select switch 48 is opened at a block 98 to change the cutoff frequency of the LPF 44 to the higher value. Then the seek speed signal suiting the remaining number of tracks is generated at the next block 90.

Figure 6:
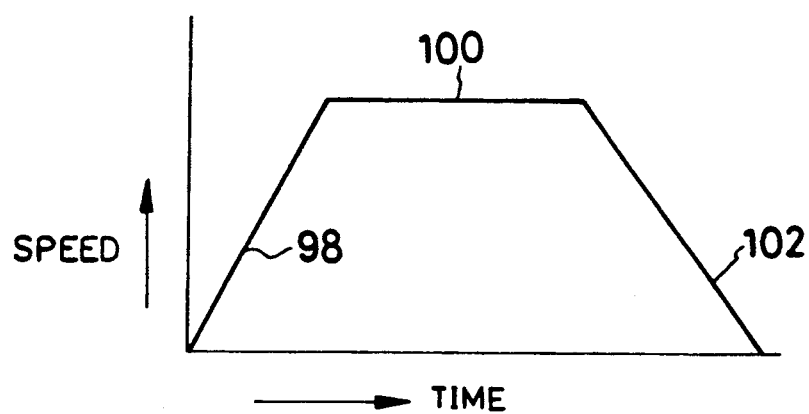
FIG. 6 is a graphic representation of the speed control curve by which the traveling speed of the transducer is controlled when the transducer is at a relatively long distance from a destination track.
Figure 7:
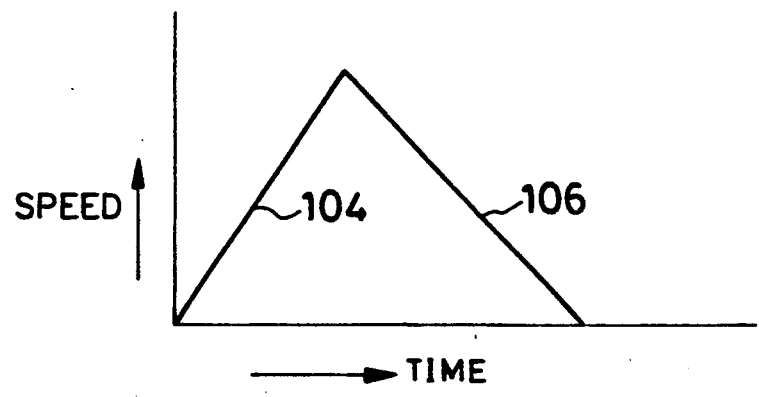
FIG. 7 is a graphic representation of the speed control curve by which the traveling speed of the transducer is controlled when the transducer is at a relatively short distance from a destination track.

The seek data (seek speed signal) is determined by the microprocessor 32 in accordance with the predefined speed control curves of FIGS. 6 and 7. FIG. 6 is a graphic representation of the seek speed control curve in cases where the transducer is currently positioned at a relatively long distance from the destination track. The seek speed control curve has a linear acceleration period 98, a constant speed period 100 an a linear deceleration period 102. The seek speed control curve may, however, consist of only a linear acceleration period 104 and a linear deceleration period 106, as shown in FIG. 7. Further, in cases where the transducer is spaced only several tracks away from the destination track, the traveling speed of the transducer may be controlled track by track.

The solid line curve $V_1$ in FIG. 8(A) represents the seek speed signal put out by the DAC 38 when the transducer 16 is to be decelerated in accordance with the linear deceleration period 102 or 106 of the seek speed control curve of FIG. 6 or 7. The seek speed curve $V_1$ is staircased to indicate stepwise decrease in the magnitude of the seek speed signal as the seek data sent from the microprocessor 32 is updated with the rotation of the disk 10 through each one sector angle.

The dashed curve $V_2$ in FIG. 8(A) represents the actual transducer speed signal put out by the speed sensor 42. The desired speed signal (curve $V_1$) and the actual speed signal (curve $V_2$) are both directed as aforesaid into the differential amplifier 40. The resulting difference signal E ($V_1 - V_2$) put out by the differential amplifier 40 is therefore as represented in FIG. 8(B). FIG. 8(C) indicates the difference signal e after having been filtered by the LPF 44.

I have plotted the curves of FIG. 8 on the assumption that the LPF 44 was switched from the low to the high cutoff frequency at a moment $t_1$ in time. A comparison of (B) and (C) in FIG. 8 will indicate that the filtered difference signal e hardly lags in phase behing the original difference signal E after the moment $t_1$. Consequently, as the transducer 16 approaches the destination track, the voice coil motor 20 can be accurately controlled in accordance with the desired speed signal curve $V_1$, making it possible to stop and position the transducer exactly on the destination track.

Of course, the filtered difference signal e lags in phase behind the original difference signal E just as much as theretofore before the LPF 44 is switched to the higher cutoff frequency. The transducer 16 is so far away from the destination track when the LPF is operating at the lower cutoff frequency, that the greater phase lag does not affect in any way the exact positioning of the transducer on the destination tracks.

SECOND FORM

The variable LPF 44 of FIG. 3 can be modified as shown in FIG. 9. The modified LPF 44a differs from the LPF 44 in having but one capacitor 110 connected between one of the inputs and the output of the operational amplifier 68. Also, a serial circuit of two resistors 112 and 114 is connected in parallel with the capacitor 110. The cutoff frequency select switch 48 is connected in parallel with the resistor 114. The other details of construction are as previously set forth with reference to FIG. 3.

Let C be the capacitance of the capacitor 110, and $R_1$ and $R_2$ the resistances of the resistors 112 and 114. Then the cutoff frequency $f_1$ in hertz of the LPF 44a when the switch 48 is closed is:

$$f_2 = \frac{1}{2\pi(R_1 + R_2)C}.$$

The cutoff frequency $f_2$ of the LPF 44 when the switch 48 is open, on the other hand, is:

$$f_1 = \frac{1}{2\pi C_1 R}.$$

It is thus seen that the cutoff frequency $f_1$ of the LPF 44a when the switch 48 is closed is lower than that, $f_2$, when the switch is open. The LPF 44a may therefore be switched from the lower $f_1$ to the higher $f_2$ cutoff frequency when the transducer draws sufficiently near to the destination track during each track seeking operation.

POSSIBLE MODIFICATIONS

Although I have shown and described my invention in highly specific aspects thereof and as embodied in a hard disk data storage system, I do not wish my invention to be limited by the exact details of this disclosure. A variety of modifications, alterations and adaptations of the teachings hereof may be resorted to by one skilled in the art within the broad teaching hereof. For example:

1. A timing circuit could be connected between microprocessor 32 and wave shaping circuit 58 for generating a suitable timing signal in response to the sector pulses from the wave shaping circuit. The microprocessor 32 would then latch the track data from the read circuit 30 in response to the timing signal instead of to the sector pulse.

2. A circuit could be provided independent of the wave shaping circuit 58 for sending timing pulses to the microprocessor 32 at sector intervals.

3. The microprocessor may be replaced by individual circuits including those shown in FIG. 2.

4. Track data could be recorded on the identification fields of the data sectors instead of on the servo sectors.

5. The essential features of my invention, notably including the variable cutoff frequency LPF, could be incorporated in various transducer positioning systems other than that disclosed herein.

What I claim is:

1. In a data storage apparatus including a transducer for data transfer with a rotating data storage disk, a transducer position control system comprising:
    (a) positioning means connected to the transducer for moving the transducer substantially radially of the data storage disk and for positioning the transducer over any selected position in the radial direction of the disk;
    (b) control circuit means for providing a seek speed signal representative of variable desired speed at which the transducer is to be moved by the positioning means with respect to the data storage disk;
    (c) a speed sensor coupled to the positioning means for generating a transducer speed signal representative of the actual traveling speed of the transducer;
    (d) a difference signal generator circuit connected to both the control circuit means and the speed sensor for providing a difference signal representative of the difference between the seek speed signal and the transducer speed signal;
    (e) a low pas filter connected to the difference signal generator circuit and having a first and a second cutoff frequency, the first cutoff frequency being lower than the second cutoff frequency.
    (f) a driver circuit connected between the low pass filter and the positioning means for causing the positioning means to move the transducer at a speed determined by an output from the low pass filter;
    (g) switch means connected to the low pass filter for switching between the first and the second cutoff frequency; and
    (h) switch control means connected to the switch means for actuating the switch means in order to cause a change from the first to the second cutoff frequency when, during transducer movement from a first radial position to a second on the data storage disk, the distance between the current position of the transducer and the second radial position on the disk decreases to a predetermined value.

2. The transducer position control system of claim 1 wherein the low pass filter comprises:

(a) an operational amplifier having an input connected to the difference signal generator circuit, and an output connected to the driver circuit;
(b) an input resistor connected between the difference signal generator circuit and the operational amplifier;
(c) a feedback resistor connected between the input and the output of the operational amplifier; and
(d) a series circuit of two capacitors connected in parallel with the feedback resistor.

3. The transducer position control system of claim 2 wherein the switch means comprises an on-off switch connected in parallel with one of the capacitors of the low pass filter.

4. The transducer position control system of claim 1 wherein the low pass filter comprises:
(a) an operational amplifier having an input connected to the difference signal generator circuit, and an output connected to the driver circuit;
(b) an input resistor connected between the difference signal generator circuit and the operational amplifier;
(c) a capacitor connected between the input and the output of the operational amplifier; and
(d) a series circuit of two resistors connected in parallel with the capacitor.

5. The transducer position control system of claim 4 wherein the switch means comprises an on-off switch connected in parallel with one of the resistors of the low pass filter.

6. In a data storage apparatus including a transducer for data transfer with a rotating data storage disk having a multiplicity of concentric data tracks formed thereon, a transducer position control system comprising:
(a) positioning means including a positioning motor and connected to the transducer for moving the transducer across the data tracks on the disk and for positioning the transducer over any selected one of the tracks;
(b) a speed sensor coupled to the positioning means for generating a transducer speed signal representative of the actual traveling speed of the transducer;
(c) a read circuit connected to the transducer for providing read data representative of data recovered by the transducer from the data tracks on the disk, the read data including information indicative of the instantaneous current position of the transducer with respect to the data traks;
(d) a controller connected to the read circuit for providing a seek speed signal representative of variable desired speed at which the transducer is to be moved by the positioning means so as to make zero the difference between the current transducer position and a desired destination track on the disk;
(e) a differential amplifier having a first input connected to the speed sensor and a second input connected to the controller for providing a difference signal proportional to the difference between the transducer speed signal and the seek speed signal;
(f) a low pass filter connected to the differential amplifier and having a first and a second cutoff frequency, the first cutoff frequency being lower than the second cutoff frequency;
(g) a driver circuit connected between the low pass filter and the positioning motor for causing the positioning means to move the transducer at a speed determined by an output from the low pass filter;
(g) a cutoff frequency select switch connected to the low pass filter for switching between the first and the second cutoff frequency thereof; and
(h) switch control means included in the controller and connected to the cutoff frequency select switch, the switch control means actuating the cutoff frequency select switch for causing a change from the first to the second cutoff frequency when, during each track seeking operation, the distance between the instantaneous current position of the transducer and the destination track on the disk decreases to a predetermined value.

* * * * *

UNITED STATES PATENT AND TRADEMARK OFFICE
CERTIFICATE OF CORRECTION

PATENT NO. : 5,128,812

DATED : July 7, 1992

INVENTOR(S) : Hisatoshi Uno

It is certified that error appears in the above-identified patent and that said Letters Patent is hereby corrected as shown below:

Column 2, line 9    change "turn in" to -- turn is --.

Column 2, line 43   change "blocck" to -- block --.

Column 2, line 68   change "altermative" to -- alternative --.

Column 3, line 9    change "allso" to -- also --.

Column 4, line 17   change "Thus," to -- Thus --.

Column 6, line 7    change "any" to -- my --.

Column 6, line 54   change "an" to -- and --.

Column 7, line 16   change "behing" to -- behind --.

Column 7, line 25   change "theretofore" to -- heretofore --.

Column 7, line 30   change "tracks" to -- track --.

UNITED STATES PATENT AND TRADEMARK OFFICE
CERTIFICATE OF CORRECTION

PATENT NO. : 5,128,812
DATED : July 7, 1992
INVENTOR(S) : Hisatoshi Uno

It is certified that error appears in the above-indentified patent and that said Letters Patent is hereby corrected as shown below:

Column 8, line 46  change "pas" to -- pass --.

Column 8, line 49  change "frequency." to -- frequency; --.

Column 10, line 9  change "traks;" to -- tracks --.

Signed and Sealed this

Tenth Day of May, 1994

*Attest:*

BRUCE LEHMAN

*Attesting Officer*   *Commissioner of Patents and Trademarks*